UNITED STATES PATENT OFFICE.

JEAN ALTWEGG AND DAVID EBIN, OF LYON, FRANCE, ASSIGNORS TO SOCIETE CHI-MIQUE DES USINES DU RHONE, (ANCIENNEMENT GILLIARD P. MENNET ET CARTIER), OF PARIS, FRANCE.

PROCESS FOR THE PREPARATION OF TWICE-SUBSTITUTED 2-4-DIKETO-TETRAHYDRO-OXAZOLS.

1,375,949. Specification of Letters Patent. Patented Apr. 26, 1921.

No Drawing. Application filed July 8, 1920. Serial No. 394,606.

*To all whom it may concern:*

Be it known that we, JEAN ALTWEGG, of 227 bis Avenue de Saxe, at Lyon, France, a citizen of the Confederation of Switzerland, and DAVID EBIN, of 4 Rue de la Bourse, at Lyon, France, a citizen of the Republic of Poland, have invented certain new and useful Improvements in or Relating to Processes for the Preparation of Twice-Substituted 2-4-Diketo-Tetrahydro-Oxazols, of which the following is a specification.

This invention relates to the preparation of in position 5 twice substituted derivatives of 2-4-diketo-tetra-hydro-oxazol of the general formula:

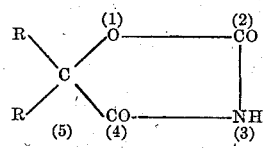

in which R and R' signify radicals of the aliphatic or aromatic series.

These substances, which have not yet been described in literature, have notable physiological properties. They are obtained by the action of an alkyl ester of chloro-formic acid, upon a twice substituted amid of glycolic acid. It is sufficient to heat the mixture of these two substances in order to bring about the reaction with separation of hydrochloric acid and an alcohol corresponding to the ester of the chloro-formic acid employed.

Almost the theoretical yield is obtained when the process is carried out in presence of a neutral organic solvent, such for instance as a hydrocarbon or a carbon chlorid compound and in the presence of an alkali-carbonate.

The twice substituted in position 5 derivatives of 2-4-diketo-tetra-hydro-oxazol form colorless crystals which are fairly easily soluble in boiling water and easily soluble in most organic solvents. The aqueous solution is tasteless, of an acid character and gives, when neutralized with bases, well characterized salts. The salts of the alkali-metals, of the alkaline earths and of magnesium are very soluble in water, and these solutions are of slightly bitter taste. They can be sterilized in steam without decomposition.

The new compounds have valuable hypnotic, sedative and narcotic properties and are, when dispensed in efficient dose, in no way injurious to human organisms. They can be used in the form of solutions of their soluble salts by mouth or in subcutaneous or intramuscular injection.

*Example I.*

450 gr. of phenylethyloxy-acetamid (made for example according to the data in the "*Journal für Pract. Chem.*", (2. series) 84: page 744) are dissolved in 3 liters of boiling toluene, and 700 gr. anhydrous potassium carbonate are added while stirring and gradually (in the course of about two hours) 300 gr. chloro-formate of ethyl are also added.

During this first part of the process a portion (about 1 liter) of the toluene is allowed to continuously distil over; the alcohol and the water formed also pass over.

After the chloro-formic acid ester has been added the mixture is further heated for one hour with a reflux condenser and then as much cold water is added as is necessary in order to completely dissolve the salts formed. The aqueous solution is decanted off and is treated with the necessary amount of sulfuric acid. An oil separates out which after a time solidifies to a crystalline mass, being the 5-5-phenylethyl-2-4-diketo-tetra-hydro-oxazol which can be purified by distillation under a reduced pressure. The greater part goes over under a pressure of 3 mm. of mercury at 176° C. and crystallizes after cooling. The crystals melt at 63° C., they are almost insoluble in cold water, slightly soluble in hot water, easily soluble in alcohol, ether and benzene, less soluble in chloroform, slightly soluble in petroleum ether. The aqueous solution reacts acid. By neutralizing with the hydroxids or carbonates of the alkali and alkaline-earth metals or of magnesium, the corresponding salts are obtained which are very easily soluble in water and alcohol. The aqueous solution is neutral and has a rather bitter taste.

*Example II.*

One molecule of atrol-acetamid (prepared, for example, according to the data in "*Annalen der Chemie,*" volume 380, page 280) and one molecule of chloro-formate of ethyl are dissolved in carbon tetrachlorid. The mixture is heated to boiling and simultaneously a molecule of potassium carbonate is gradually added.

The reaction is finished after 2 to 3 hours; the product is poured in water and the formed 5-5-phenyl-methyl-2-4-diketo-tetra-hydro-oxazol is isolated as given in Example I and is purified by crystallizing from dilute alcohol. Thus colorless crystals are obtained, melting at 70°, soluble with difficulty in cold water, easily soluble in alcohol and in ether, less so in petroleum ether.

What we claim and desire to secure by Letters Patent is:—

1. A process for the preparation of in position 5 twice substituted derivatives of 2-4-diketo-tetra-hydro-oxazol, characterized by the action of an alkyl ester of chloro-formic acid upon the amid of a twofold substituted glycolic acid.

2. A process for the preparation of 5-5-phenyl-ethyl-2-4-diketo-tetra-hydro-oxazol, which consists in dissolving phenylethyloxy-acetamid in boiling toluene, adding anhydrous potassium carbonate while agitating the mixture, slowly adding chloro-formate of ethyl, heating said mixture and adding cold water thereto, decanting off the aqueous solution and treating the same with sulfuric acid.

3. A process for the preparation of 5-5-phenyl-methyl-2-4-diketo-tetra-hydro-oxazol which consists in dissolving 450 gr. of phenylethyloxy-acetamid in 3 liters of boiling toluene, adding 700 gr. anhydrous potassium carbonate while stirring the mixture, slowly adding 300 gr. chloro-formate of ethyl, heating the mixture for a period of about one hour, adding cold water thereto, decanting off the aqueous solution, and treating the same with sulfuric acid.

4. The in position 5 twice substituted derivatives of 2-4-diketo-tetra-hydro-oxazol having the formula

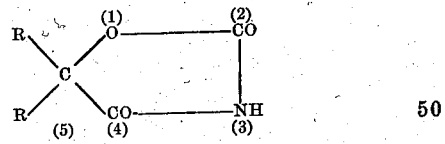

In testimony whereof we have signed our names to this specification.

JEAN ALTWEGG.
DAVID EBIN.

Witnesses:
JULIAN KEMBLE LUEDBERG.
LOUIS ESCHER.